Patented Jan. 1, 1935

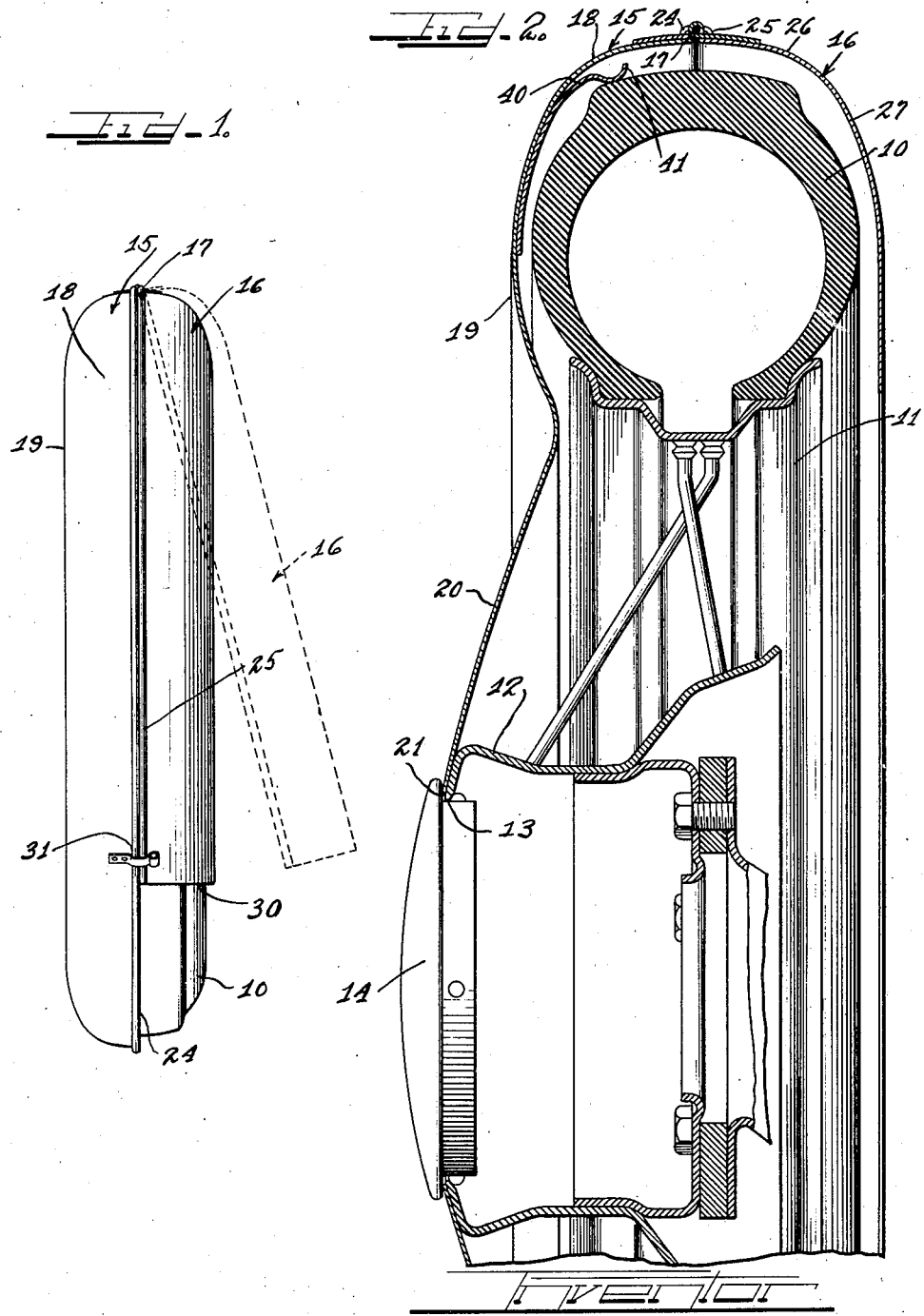

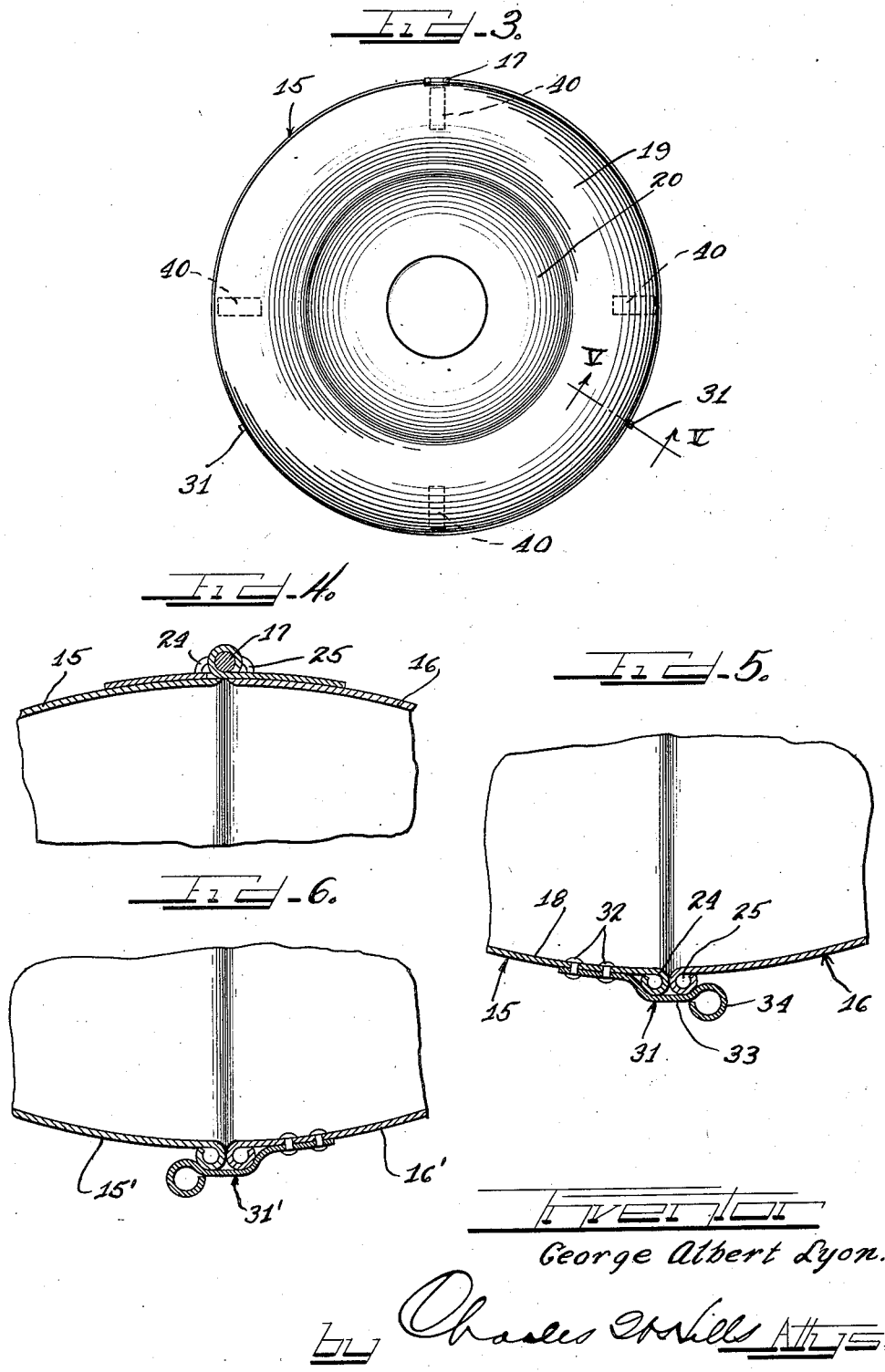

1,986,153

UNITED STATES PATENT OFFICE 1,986,153

SPARE TIRE COVER

George Albert Lyon, Detroit, Mich., assignor to Lyon Incorporated, Detroit, Mich., a corporation of Delaware Application August 21, 1933, Serial No. 686,034

3 Claims. (Cl. 150—54)

This invention relates to spare tire covers and more particularly to a multi-section cover adapted to be slipped downwardly over a spare tire.

An object of this invention is to provide an improved spare tire cover which may be readily mounted on a tire and secured thereon.

Another object of this invention is to provide a multi-section spare tire cover with novel means for maintaining the sections in proper cooperation on the spare tire.

In accordance with the general features of this invention, there is provided a spare tire cover including front and rear arcuate sections hinged together and having a line of junction at the median plane of the tire, one of said sections being formed open at the bottom and the other extending continuously all around the outer periphery of the tire.

Still another feature of the invention relates to the provision of means in one of the sections of the cover whereby that section resiliently contacts the tire and is adapted to be secured centrally of the spare tire to the hub of the wheel carrying the tire.

Other objects and features of this invention will more fully appear from the following detail description taken in connection with the accompanying drawings which illustrate several embodiments thereof and in which—

Figure 1 is an end view of a spare tire cover embodying the features of this invention and showing the spare tire cover applied to a spare tire, the dotted lines illustrating the position of the rear section prior to its being resiliently clasped to the front section.

Figure 2 is a fragmentary vertical sectional view taken through the structure shown in Figure 1 and drawn to an enlarged scale.

Figure 3 is a front view of the cover structure shown in Figure 1 and showing in dotted lines the location of the resilient tread contacting springs.

Figure 4 is an enlarged fragmentary sectional view similar to the upper portion of the cover shown in Figure 2, showing in detail the hinge between the front and rear sections.

Figure 5 is an enlarged fragmentary sectional view taken on substantially the line V—V of Figure 3, showing in detail the construction of one of the resilient clips adjacent the bottom of the cover for holding the cover sections in proper cooperation.

Figure 6 is a view similar to Figure 5 showing a modification of the invention, in which the clip is carried by the rear section instead of by the front section.

The reference character 10 designates generally a spare tire carried by a conventional wheel 11 including a centrally disposed hub 12. The wheel hub 12 has provided in it an opening 13 for accommodating the usual hub cap 14 which, in the illustrated embodiment of the invention, serves to clamp the side portion of the spare tire cover to the wheel hub as will be described more fully hereinafter.

The spare tire cover as illustrated embodies front and rear arcuate sections 15 and 16 pivotally or hingedly connected at 17. The hinge construction designated generally by the reference character 17 and as best shown in Fig. 4 may be of any suitable construction and is located at the top of the spare tire cover.

The front section 15 extends continuously all around the outer periphery of the tire and embodies a tread covering portion 18 and a tire side covering portion 19. The tire side covering portion 19, which is disposed over the outer side wall of the spare tire 10, is annular in shape and terminates inwardly of the tire in a centrally bulged portion 20 having a central opening 21 for accommodating the hub cap 14. This hub cap 14 as best shown in Figure 2, is adapted to engage the edge of the opening 21 to clamp the outer section 15 of the cover to the wheel hub 12.

It will be noted that the portions 18 and 19 of the outer or front section 15 are transversely curved and of convex contour so as to conform generally with the contour of the spare tire 10. The tread covering portion 18 of the front section 15 extends substantially to the median plane of the spare tire 10 and is provided with a beaded edge 24 adapted to engage a similarly beaded edge 25 on the rear section 16. The rear cover section 16 also includes a tread covering portion 26 and a tire side covering portion 27 disposed over the rear side of the spare tire 10. It should be noted, however, that the rear section is of a lesser depth than that of the front section inasmuch as it is not provided with any bulged portion, such as the portion 20 of the front section. The portions 26 and 27 are also of curved cross-sectional shape and are of convex contour so as to conform generally with the contour of the rear half of the spare tire 10.

The rear cover section 16 unlike the front cover section 15 does not extend clear around the outer periphery of the tire but is cut away at the bottom of the cover as indicated at 30 in Figure 1.

In other words, the rear section 16 is in the form of a split or open bottom ring. This construction is advantageous inasmuch as it facilitates application of the cover to the spare tire and permits of a better fit of the cover on the tire.

The rear section 16 is provided, below the upper half of the cover, with means in the form of two resilient clips 31—31 for resiliently clamping the rear section in cooperation with the front section on the spare tire 10. These spaced clips 31—31 are located at the ends of the split ring section 16 and in the preferred embodiment of the invention, are illustrated as being secured to the tread covering portion 18 of the front section 15. One end of each of these clips is secured by any suitable means, such as the rivets 32, to the tread covering portion 18 of the front section and the other end of the clips 31—31 is offset laterally as indicated at 33 to resiliently engage over the beads 24 and 25 of the two sections (Figure 5). Also, the laterally offset portion 33 of the clip is provided at its free end with a ring-like handle 34 by means of which the clip may be pulled outwardly out of contact or engagement with the bead 25 on the rear section 16 whereby the rear section may be swung to the dotted line position shown in Figure 1.

In Figure 6 I have illustrated a modification of the invention in which the resilient clip 31' is secured to the tread covering portion of the rear section 16' instead of to the front section 15'. With this exception, the structure shown in Figure 6 is substantially identical with that shown in Figure 5.

Furthermore, it will be noted from Figures 2 and 3 that the front cover section 15 is provided interiorly of the cover with a plurality of spaced resilient tread contacting springs 40. One end of each of these springs 40 is suitably secured to the interior surface of the side portion 19 of the front section 15. The other end of each of these springs is offset laterally into a flexible curved finger 41 adapted to resiliently engage the outer periphery or tread of the tire 10. These springs aid in centering the cover on the tire and tend to minimize rattling.

In the application of the spare tire cover to the tire, the rear section 16 is pivoted outwardly from the front section and the front section is then placed over the front half of the spare tire with the springs 40 contacting the outer periphery of the tire. These springs, as previously noted, aid in centering the tire cover on the tire, as well as provide for a yieldable fit between the cover and the tire. After the front section 15 has been properly placed over the front half of the spare tire 10, the hub cap 14 is inserted through the opening 21 in the front section 15 and brought into cooperation with the wheel hub 12. This permits of the use of the hub cap to clamp the central part of the front section to the wheel hub. Thereafter, the rear section 16 is swung downwardly to the dotted line position shown in Figure 1 until its bead 25 strikes the spring clips 31 which are thereafter moved outwardly to permit of the bead 25 being moved under the offset portion 33 of the clamp to the position shown in Figure 5. When the rear section 16 is in this position, it is resiliently held in engagement with the bead 24 on the rear edge of the cover section 15. The spring clips 31 should have sufficient resiliency to hold the two cover parts in proper cooperation with the beaded edges 24 and 25 in engagement substantially at the median plane of the spare tire 10.

Now I desire it understood that while I have illustrated and described in detail several embodiments of this invention, the invention is not to be thus limited but only insofar as defined by the scope and spirit of the appended claims.

I claim as my invention:

1. In a multi-part tire cover, an arcuate section including side and tread covering portions, said side covering portion being provided centrally of the tire with means whereby it may be secured to the hub of the spare wheel in which the spare tire is mounted and an arcuate retaining ring for disposition at the other side of the tire and resiliently held in cooperation with said section, said ring being of a lesser depth than that of said section and having an inwardly extending rear tire side covering portion.

2. In a non-collapsible spare tire cover, front and rear arcuate and transversely curved sections each having a tread covering portion and a tire side covering portion with the side covering portion and said rear section of a lesser depth than that of the other side covering portion, the tire side covering portion of said front section being provided with means disposed centrally of the cover whereby said section may be secured to the hub of the wheel carrying said spare tire, said sections being provided with means to cause them to be resiliently urged into engagement with each other on the tire.

3. In a non-collapsible spare tire cover, front and rear arcuate and transversely curved sections each having a tread covering portion and a tire side covering portion with the side covering portion and said rear section of a lesser depth than that of the other side covering portion, the tire side covering portion of said front section being provided with means disposed centrally of the cover whereby said section may be secured to the hub of the wheel carrying said spare tire, said sections being provided with means to cause them to be resiliently urged into engagement with each other on the tire, said rear section comprising an open bottom or split ring provided with resilient clamp means whereby it may be resiliently connected to the front section.

GEORGE ALBERT LYON.

DISCLAIMER 1,986,153.—*George Albert Lyon*, Detroit, Mich. SPARE TIRE COVER. Patent dated January 1, 1935. Disclaimer filed August 4, 1939, by the inventor.
Hereby enters this disclaimer as to claims 1 and 2.
[*Official Gazette September 5, 1939.*]